US005462030A

United States Patent [19]

Shinogle

[11] Patent Number: 5,462,030

[45] Date of Patent: Oct. 31, 1995

[54] ENCAPSULATED ADJUSTABLE RATE SHAPING DEVICE FOR A FUEL INJECTION SYSTEM

[75] Inventor: Ronald D. Shinogle, Peoria, Ill.

[73] Assignee: Caterpillar Inc., Peoria, Ill.

[21] Appl. No.: 251,523

[22] Filed: May 31, 1994

[51] Int. Cl.$^{6}$ .......................... F02M 37/04; F16K 31/14; F02B 3/00

[52] U.S. Cl. .......................... 123/457; 123/510; 123/300; 137/495; 137/505

[58] Field of Search .................................. 123/457, 467, 123/510, 511, 299, 300, 506; 137/495, 461, 481, 505, 901

[56] References Cited

U.S. PATENT DOCUMENTS

| | | | |
|---|---|---|---|
| 830,144 | 9/1906 | Frantz . | |
| 959,951 | 5/1910 | L'Orange . | |
| 1,365,301 | 1/1921 | Brooks . | |
| 1,586,623 | 6/1926 | Heidelberg et al. . | |
| 2,012,086 | 8/1935 | Mock . | |
| 2,265,692 | 12/1941 | Kammer . | |
| 2,813,752 | 11/1957 | Pringham . | |
| 2,890,657 | 6/1959 | May et al. . | |
| 2,951,643 | 9/1960 | Engel, Jr. | 239/90 |
| 3,014,466 | 12/1961 | Monnot et al. . | |
| 3,104,817 | 9/1963 | Vander Zee et al. | 239/90 |
| 3,216,407 | 11/1965 | Eyzat . | |
| 3,438,359 | 4/1969 | Thoma . | |
| 3,575,146 | 4/1971 | Creighton et al. . | |
| 3,951,119 | 4/1976 | Jaggle et al. | 123/457 |
| 3,985,157 | 10/1976 | Ferguson | 137/505 |
| 4,022,165 | 5/1977 | Eckert et al. . | |
| 4,516,595 | 5/1985 | Acomb | 137/505 |
| 4,530,337 | 7/1985 | Laufer | 123/300 |
| 4,617,898 | 10/1986 | Gayler | 123/510 |
| 4,621,599 | 11/1986 | Igashira et al. . | |
| 4,779,599 | 10/1988 | Phillips | 123/506 |
| 4,811,899 | 3/1989 | Egler . | |
| 4,838,232 | 6/1989 | Wich | 123/300 |
| 5,029,568 | 7/1991 | Perr | 123/506 |
| 5,054,445 | 10/1991 | Henkel et al. | 123/506 |
| 5,111,793 | 5/1992 | Deeds | 123/457 |
| 5,113,831 | 5/1992 | Grant | 123/457 |
| 5,186,147 | 2/1993 | Bellis | 123/457 |
| 5,226,453 | 7/1993 | Biggers et al. | 137/901 |
| 5,257,608 | 11/1993 | Harde | 123/510 |
| 5,339,785 | 8/1994 | Wilksch | 123/457 |
| 5,351,667 | 10/1994 | Mori et al. | 123/510 |

OTHER PUBLICATIONS

Paul G. Burman & Frank DeLuca, "Fuel Injection and Controls For Internal Combustion Engines," Simmons–Boardman (1962), pp. 53–67, 138–141, 280–281.

K. P. Mayer, "Fuel economy, emissions and noice of multi–spray light duty DI diesels–current status and development trends," *SAE* Paper No. 841288, C421/84 IMechE/SAE (1984), pp. 89–98.

*Primary Examiner*—Thomas H. Moulis
*Attorney, Agent, or Firm*—Marshall, O'Toole, Gerstein, Murray & Borun

[57] ABSTRACT

A fuel injection control mechanism for use in a fuel system is adapted to be connected between a fuel injection pump and a fuel injector. The mechanism includes a main passage, a chamber, a primary valve connecting the main passage to the chamber, a piston disposed within the chamber, a spring biasing the piston toward the primary valve and an adjustment compartment. A wall separates the chamber from the adjustment compartment, and a removable cap encloses the adjustment compartment. Apparatus is provided for adjusting the biasing force of the spring and travel limits of the piston. Adjustment can be accomplished to vary fluid characteristics in the fuel delivered to the injector without the need to disassemble the mechanism or disconnect the mechanism from the fuel system.

19 Claims, 3 Drawing Sheets

ENCAPSULATED ADJUSTABLE RATE SHAPING DEVICE FOR A FUEL INJECTION SYSTEM

TECHNICAL FIELD

The present invention relates to fuel injection systems for internal combustion engines, and more particularly to devices for controlling the injection of fuel into an engine combustion chamber.

BACKGROUND ART

In a single-injection fuel injection system in which a single or uninterrupted charge of fuel is injected into an engine combustion chamber or cylinder during each combustion cycle, incomplete combustion can occur wherein the spray of fuel into the combustion chamber is not completely burned prior to the exhaust phase of the engine. Incomplete combustion can cause a large increase in engine emissions, and is therefore to be avoided as much as possible.

A different problem encountered during operation of an internal combustion engine (especially those using diesel fuels) is an excessive rate of pressure rise in the combustion chamber after ignition of the fuel charge. This condition is caused by a delay period from the beginning of injection of fuel to the initiation of ignition of the fuel. See, Burman, P. G. and DeLuca, F., *Fuel Injection and Controls* (1962), Chapter 11, "Diesel Engine Combustion" at p. 138. This excessive rate of pressure rise is undesirable because it applies high stresses to engine components and causes rough engine operation.

One known method of minimizing incomplete combustion and the excessive rate of pressure rise is known as "split injection." Split injection involves the injection of a pilot fuel charge into the combustion chamber prior to injection of a main or primary fuel charge during each fuel injection cycle. The pilot fuel charge is smaller in volume and duration of delivery than the main fuel charge and is ignited before the main fuel charge is injected into the combustion chamber. Injection of the pilot fuel charge results in burning of the main fuel charge in a relatively uniform and complete manner in comparison to a single-injection system, yielding smoother engine performance, reduced emissions, and reduced engine noise. The excessive rate of pressure rise in the combustion chamber and excessive emissions can be further controlled by controlling the fuel injected during the pilot injection.

U.S. Pat. No. 3,014,466 issued to Monnot et al. on Dec. 26, 1961, U.S. Pat. No. 3,216,407 issued to Eyzat on Nov. 9, 1965, and U.S. Pat. No. 4,022,165 issued to Eckert et al. on May 10, 1977, disclose the use of auxiliary fuel lines which permit injection of a pilot charge. The drawback of such a design is that it requires additional fuel lines. Also, installation of such a system in many applications may be difficult because of space constraints within the engine compartment.

Fuel injectors are known in the art which are designed to inject a pilot fuel charge without the need for other devices. U.S. Pat. No. 2,813,752 issued to Pringham on Nov. 19, 1957, U.S. Pat. No. 2,951,643 issued to Engel, Jr. on Sep. 6, 1960, and U.S. Pat. No. 3,104,817 issued to Vander Zee et al. on Sep. 24, 1963, disclose fuel injection nozzles having the capability to introduce a pilot charge and a main charge. However, these nozzles must typically be customized for each engine in which they are to be installed.

A paper authored by K. P. Mayer, entitled "Fuel economy, emissions and noise of multi-spray light duty DI diesels—current status and development trends," *SAE* Paper No. 841288 (1984), discloses the use of a separate mechanical split injection device disposed between a high pressure fuel line and a fuel injection nozzle. A piston loaded by a spring is disposed in fluid communication with the high pressure fuel line. As fuel pressure increases during each injection cycle, the piston retracts, thereby increasing the fuel volume. The increase in fuel volume results in a momentary reduction in fuel pressure delivered to the nozzle during each injection cycle. The Mayer paper does not disclose means for adjusting in situ the Mayer device for different applications or operating conditions.

In addition to the foregoing, U.S. Pat. No. 3,575,146 issued to Creighton et al. on Apr. 20, 1971, and U.S. Pat. No. 4,621,599 issued to Igashira et al. on Nov. 11, 1986, disclose electronically controlled fuel injection systems which regulate the flow of fuel during a pilot charge and a main charge. Igashira '599 also discloses a fuel injection control system which injects a third fuel charge in addition to main and pilot charges. These control systems are complex and add considerable cost to the design and manufacture of fuel injection systems. Furthermore, they are not readily retrofitted to existing engines which use conventional single-injection fuel systems.

U.S. Pat. No. 3,438,359 issued to Thoma on Apr. 15, 1969, discloses the use of a valve disposed between a high pressure fuel line and an injector nozzle. The valve regulates and meters the fuel flow such that a pilot charge is injected without the need for a specially adapted nozzle, separate pilot fuel line, or complex fuel injection control system.

The Thoma '359 device includes a piston disposed in a valve body which is preloaded by a helical compression spring.

At the beginning of each fuel injection sequence, the rise in fuel pressure which accompanies each injection pulse acts in opposition to the spring. Thus the piston is displaced and fuel flows into a reservoir. The flow of fuel into the reservoir causes a momentary pressure drop which defines the intermediate drop in fuel pressure between the pilot injection pulse and main injection pulse.

The disadvantages of the Thoma '359 device are twofold. First, the device is costly to produce because the intricate design of the piston demands a number of relatively expensive machining operations. Second, the device is not adjustable, and must be custom designed and built for each different engine design with which it is to be used.

Newer engines often include split injection capabilities. However, there is a need for an inexpensive, simple and reliable retrofit device for an existing engine having a single-injection fuel injection system to convert such an engine into one having split injection capability and which can facilitate precise control over fuel injection characteristics in order to control the rate of pressure rise in the combustion chamber and minimize incomplete combustion.

DISCLOSURE OF THE INVENTION

An adjustable fuel injection control mechanism is adapted for connection between a high pressure fuel line and each fuel injector of an internal combustion engine. The mechanism may be installed on an existing engine previously having a single-injection fuel system, thereby giving the engine split injection capability.

More specifically, in accordance with one aspect of the present invention, a fluid control mechanism comprises a main body, a controlling means and an adjusting means both carried by the main body. The controlling means controls a fluid characteristic and includes a chamber and moveable piston in the chamber. The adjusting means are accessible from outside the mechanism and permit adjustment of the fluid characteristic without disassembly of the fluid control mechanism.

Preferably, a cap is removably mounted on the main body and encloses the controlling means and the adjusting means.

Also, the mechanism preferably includes means for placing the chamber in fluid communication with a fluid line. The placing means may comprise a primary check valve disposed between the fluid line and the chamber.

Also, in the preferred embodiment of the present invention, the mechanism includes means biasing the piston toward an end of the chamber and the adjusting means includes means for altering a force applied to the piston by the biasing means.

Still further, it is preferred that the biasing means comprises a helical compression spring and the altering means comprises a spring stop abutting the helical compression spring which is moveable along a direction along which the piston is moveable.

Also preferably, the spring is disposed between the spring stop and the piston and the adjusting means includes means for selecting a travel limit of the piston.

It is also preferred that the selecting means comprises a piston stop disposed within the chamber wherein the piston stop abuts the piston at the travel limit of the piston and is moveable along a direction along which the piston is moveable.

In accordance with another aspect of the present invention, a fuel injection control mechanism comprises an inlet orifice for connection to a high pressure fuel line, an outlet orifice for connection to a fuel injector nozzle, a main passage connecting the inlet orifice and the outlet orifice and a chamber having two ends. A primary check valve is disposed between the main passage and a first end of the chamber and a piston stop is disposed in the chamber. A piston is slidably mounted between the piston stop and the primary check valve. A biasing means is disposed between the piston and a second end of the chamber and exerts a force on the piston. Means accessible from outside the chamber allow adjustment of the piston stop and the force exerted by the biasing means on the piston. Further, a removable cap encloses the adjustment allowing means.

A fuel injection control mechanism constructed in accordance with the present invention is a cost effective, simple, and adjustable device for solving the problems of incomplete combustion and the excessive rate of pressure rise in internal combustion engines. A fuel injection control mechanism made in accordance with the present invention can be installed into existing engines without the need for extensive modifications or additional fuel lines. Because the mechanism is adjustable in situ, it is unnecessary to design and manufacture a separate mechanism for each specific engine application or set of operating conditions. Also, the mechanism may be adjusted without disassembly or removal of the mechanism from the fuel injection system in which it is installed.

Other features and advantages are inherent in the apparatus claimed and disclosed or will become apparent to those skilled in the art from the following detailed description in conjunction with the accompanying drawings.

BEST MODE FOR CARRYING OUT THE INVENTION

Figure 1:
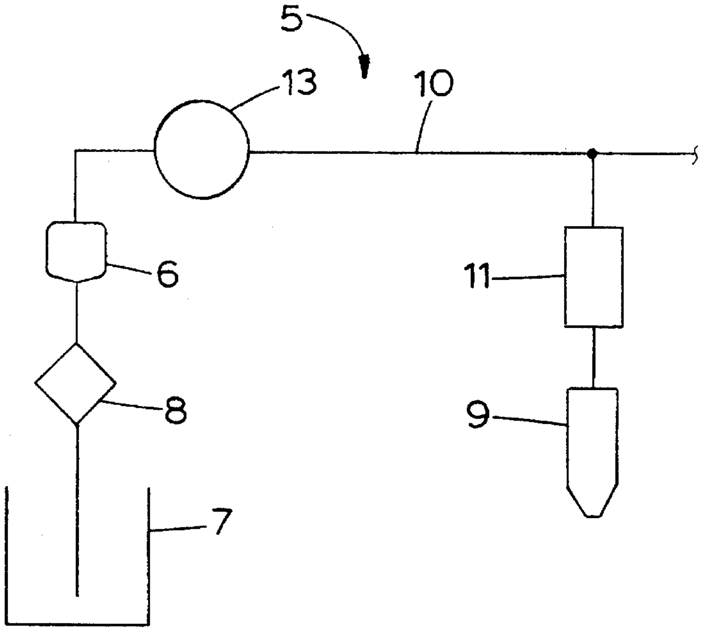
FIG. 1 comprises a block diagram of a fuel injection system incorporating the present invention.

Referring now to FIG. 1, a fuel injection system 5 includes a fuel transfer pump 6 which receives fuel from a fuel tank 7 and a filter 8 and delivers same to one or more fuel injectors 9 via an injection pump 13 and one or more fuel supply lines or conduits 10. The fuel injectors 9 inject fuel into associated combustion chambers or cylinders (not shown) of an internal combustion engine. A fuel injection control mechanism 11 is disposed between the fuel line 10 and each fuel injector 9.

While one fuel injector 9 is shown in FIG. 1, it should be noted that a different number of fuel injectors may alternatively be used to inject fuel into a like number of associated engine combustion chambers. Also, the engine with which the fuel injection system 5 may be used may comprise a diesel-cycle engine, an ignition-assisted engine or any other type of engine where it is necessary or desirable to inject fuel therein.

The fuel injection system 5 comprises a pump-line-injector system wherein the injection pump 13 pressurizes the fuel flowing in the fuel lines 10 at a relatively high pressure, for example about 138 MPa (about 20,000 p.s.i.). In such a system, an internal check (not shown) of each fuel injector 9 is responsive to pressure in the lines 10 to release the pressurized fuel into the respective combustion chamber.

Figure 2:
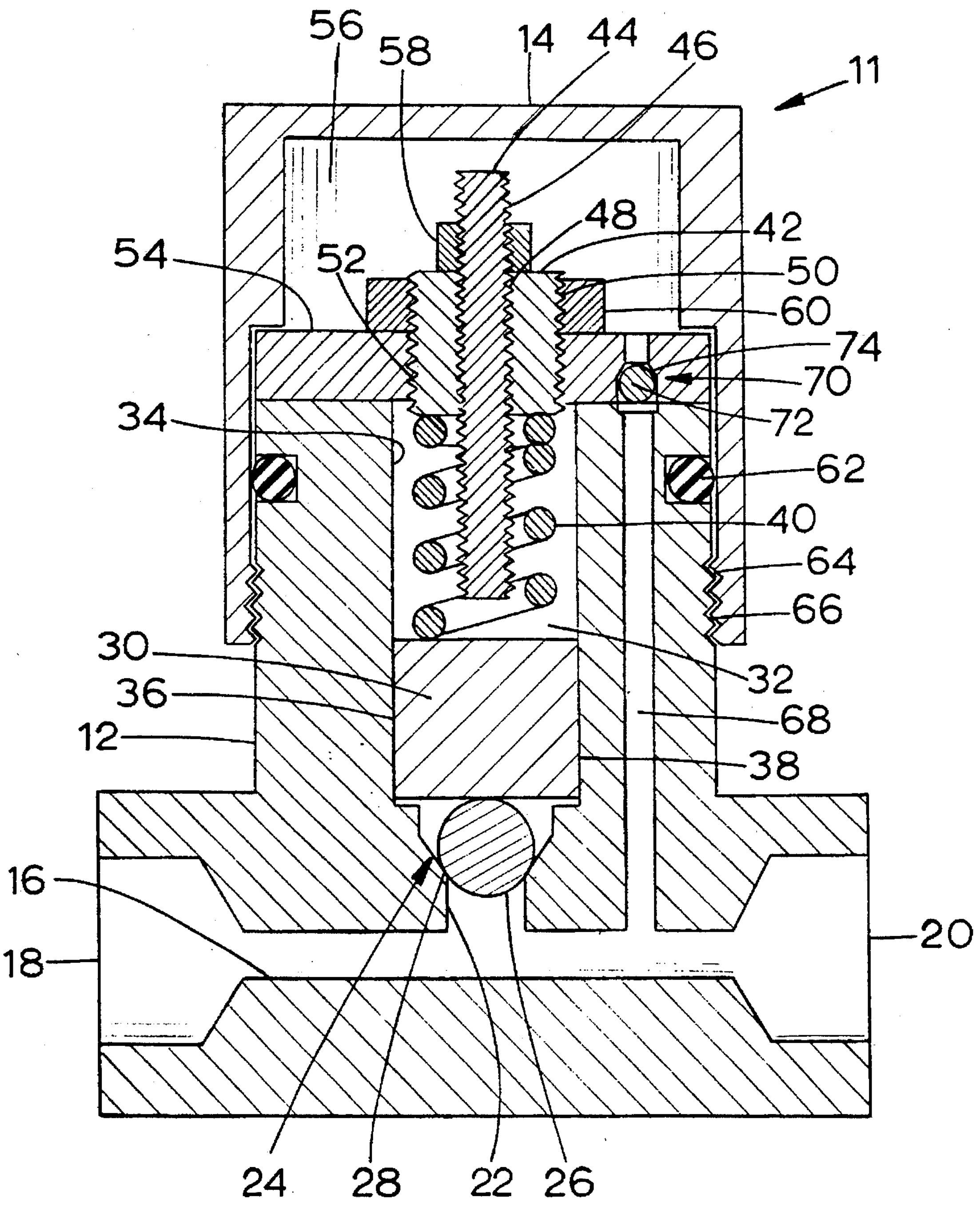
FIG. 2 comprises a diagrammatic crosssectional view of a fuel injection control mechanism in accordance with the present invention showing the primary check valve in the closed position.

Referring now to FIG. 2, the fuel injection control mechanism 11 comprises a main body 12 and a cap or cover 14 which together define the outer contours of the mechanism. The main body 12 may be constructed of any suitable material, such as steel. The main body 12 includes a main passage 16 which interconnects an inlet orifice 18, an outlet orifice 20 and a primary valve orifice 22. The inlet orifice 18 is adapted to be connected to the high pressure fuel supply line 10 while the outlet orifice is adapted to be connected to the fuel injector 9. The primary valve orifice 22 leads to a primary check valve 24.

The primary check valve 24 includes a movable valve, such as a ball valve 26, disposed between a valve seat 28 and a cylindrical piston 30. The piston 30 is slidably disposed within a chamber 32 defined by a cylindrical inner surface 34. A seal 38 is disposed between a cylindrical outer surface 36 of the piston 30 and the inner surface 34 of the chamber 32. Preferably, the seal 38 maintains a clearance of about 4 to about 8 microns between the outer surface 36 of the piston 30 and the inner surface 34 of the chamber 32. A helical compression spring 40 is compressed between the piston 30 and a hollow cylindrical spring stop 42. The travel of the piston 30 is limited by a piston stop 44.

A threaded outer cylindrical surface 46 of the piston stop 44 engages a threaded inner cylindrical surface 48 of the spring stop 42. A threaded outer cylindrical surface 50 of the spring stop 42 engages a threaded inner cylindrical surface 52 of a wall 54 which collectively sealingly divides an adjustment compartment 56 from the chamber 32. The adjustment compartment 56 is bounded by the cap 14 and the wall 54.

The piston stop 44 is secured by a piston stop lock nut 58 which is threaded onto the surface 46 and is disposed within the adjustment compartment 56. Similarly, the spring stop 42 is secured by a spring stop lock nut 60, which is threaded onto the surface 50 and is also disposed within the adjustment compartment 56.

A threaded inner cylindrical surface 64 of the cap 14 engages a threaded outer cylindrical surface 66 of the main body 12 so that the cap 14 is removably secured thereto. An O-ring 62 provides a seal between the cap 14 and the main body 12.

A secondary passage 68 defined within the main body 12 connects the adjustment compartment 56 to the main passage 16. A secondary check valve 70 is disposed within the secondary passage 68 and includes a ball valve 72 and a valve seat 74.

Industrial Applicability

Figure 4:
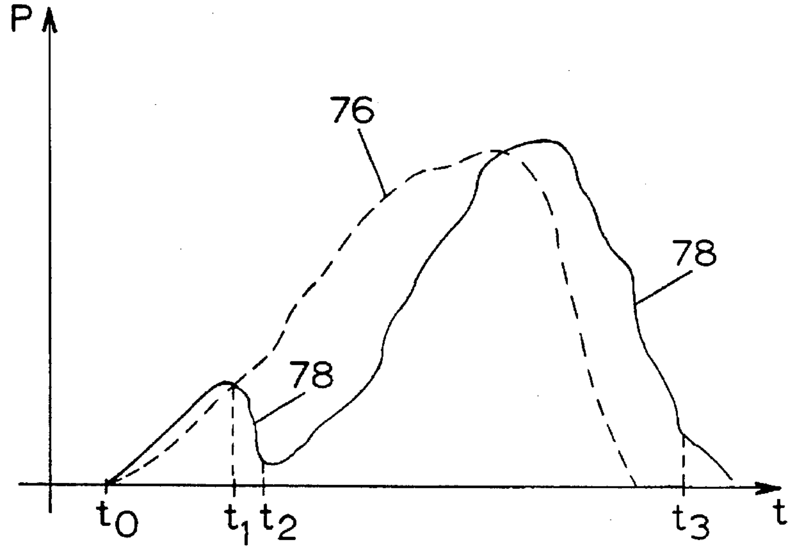
FIG. 4 comprises a graph illustrating an exemplary operation of the fuel injection control mechanism of FIGS. 1–3.

FIG. 4 illustrates curves showing fuel supply pressure, P, as a function of time, t, during one injection cycle of an injector 9. The dashed curve 76 depicted in FIG. 4 represents a typical profile of the supply pressure which would be delivered to the injector 9 from the injection pump 13 if the fuel injection control mechanism 11 were not connected thereto. The solid curve 78 in FIG. 4 represents the profile of the supply pressure which is delivered to the fuel injector 9 from the injection pump 13 when the fuel injection control mechanism 11 is utilized.

Figure 3:
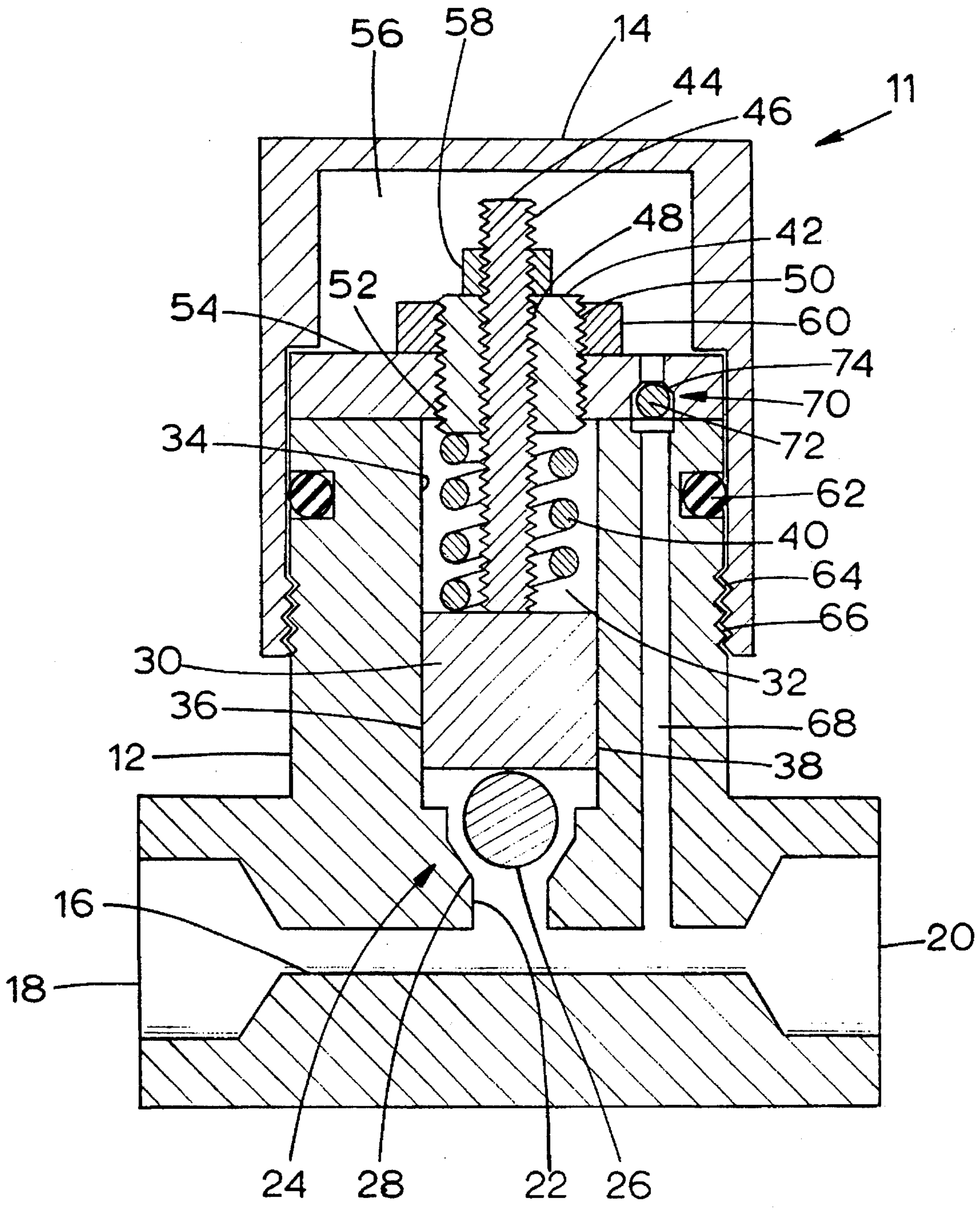
FIG. 3 comprises a view similar to FIG. 2 but showing the primary check valve in the open position.

At the beginning of a fuel injection cycle at a time $t_0$, fuel at increasing pressure is supplied by the injection pump 13 to the main passage 16 of the fuel injection control mechanism 11. When the pressure in the main passage 16 reaches a preselected level sufficient to overcome the biasing force applied to the piston 30 by the spring 40, the primary ball valve 26 and the piston 30 are displaced away from the primary valve seat 28 to the position shown in FIG. 3. Initially, the seal 38 substantially prevents flow between the outer surface 36 of the piston 30 and the inner surface 34 of the chamber 32. Once the primary valve 24 is open, pressure in the main passage 16 is momentarily lowered following a time $t_1$ due to the increase in volume resulting from the opening of the primary check valve 24 and the displacement of the piston 30.

Once the volume of the chamber 32 between the piston 30 and the valve seat 28 fills with pressurized fluid at a time $t_2$, the pressure in the main passage 16 thereafter rises and then falls generally in accordance with the solid curve 78 of FIG. 4. The fuel pressure delivered to the fuel injector 9 is controlled such that a preselected valve opening pressure (VOP) is exceeded in the interval between the times $t_0$ and $t_2$ and again exceeded after the time $t_2$ until the end of the injection sequence at a time $t_3$. Thus, a pilot fuel charge is injected between the times $t_0$ and $t_2$ and a main fuel charge is injected between the times $t_2$ and $t_3$.

As noted previously, at the beginning of an injection cycle, the seal 38 initially prevents fuel from passing into the portion of the chamber 32 above the piston 30. However, owing to the high fuel pressures which are encountered, a small amount of fuel eventually escapes or leaks into the portion of the chamber 32 above the piston 30 past the seal 38 and into the adjustment compartment 56 through the clearances between the piston stop 44 and the spring stop 42 and between the spring stop 42 and the threaded cylindrical surface 52 of the wall 54. The O-ring 62 prevents the escape of pressurized fuel from the adjustment compartment 56. Once the pressure in the main passage 16 drops below the fuel pressure in the adjustment compartment 56 at the end of an injection cycle, the secondary check valve 70 opens, permitting leakage fuel to return to the main passage 16 through the secondary passage 68.

The magnitude and time duration of the momentary decrease in pressure between the times $t_1$ and $t_2$ may be controlled by adjusting in situ the positions of the spring stop 42 and the piston stop 44. Specifically, the axial positions of the spring stop 42 and the piston stop 44 relative to the axial position of the ball valve 26 may be adjusted by removing the cap 14, loosening the spring stop lock nut 60 and the piston stop lock nut 58, and then rotating the spring stop 42 and/or the piston stop 44 until the desired positions for the spring stop 42 and the piston stop 44 are attained. The nuts 58, 60 may then be tightened and the cap 14 reinstalled on the main body 12.

Adjustment of the spring stop 42 causes a change in the pre-load of the spring 40, and thus changes the time at which the force exerted thereby is overcome by the pressure in the main passage 16. Consequently, the time $t_1$ may be adjusted within limits imposed by the adjustability of the spring stop 42 and the characteristics of the spring 40.

By adjusting the travel limits of the piston 30 through adjustment of the piston stop 44, the volume of the chamber 32 which must be filled with pressurized fluid before pressure recovery can take place (in other words, the time duration between the times $t_1$ and $t_2$) may be varied as desired. Advantageously, these adjustments can be effected without disconnecting the mechanism 11 from the high pressure fuel line 10 and the fuel injector 9.

It should be noted that the mechanism 11 might alternatively be used with a fluid utilization device other than a fuel injector. Also, other fluid characteristics might alternatively be controlled by the mechanism 11 and other means provided which are accessible from outside the main body 12 for modifying or adjusting such characteristics, if desired.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

I claim:

1. A fluid control mechanism, comprising:

a main body;

means carried by the main body for controlling a fluid characteristic including a chamber and a moveable piston in the chamber; and means carried by the main body and accessible from outside the mechanism for adjusting the fluid characteristic;

wherein the adjusting means includes means for selecting a travel limit of the piston.

2. The fluid control mechanism of claim 1, further including a cap removably mounted on the main body and enclosing the controlling means and the adjusting means.

3. The fluid control mechanism of claim 1, further including means for placing the chamber in fluid communication with a fluid line.

4. The fluid control mechanism of claim 3, wherein the placing means comprises a primary check valve disposed between the fluid line and the chamber.

5. The fluid control mechanism of claim 1, further including means for biasing the piston toward an end of the chamber.

6. The fluid control mechanism of claim 5, wherein the adjusting means includes means for altering a force applied to the piston by the biasing means.

7. The fluid control mechanism of claim 6, wherein the biasing means comprises a helical compression spring.

8. The fluid control mechanism of claim 7, wherein the altering means comprises a spring stop abutting the helical compression spring.

9. The fluid control mechanism of claim 8, wherein the spring stop is movable along a direction along which the piston is movable.

10. The fluid control mechanism of claim 8, wherein the helical compression spring is disposed between the spring stop and the piston.

11. The fluid control mechanism of claim 1, wherein the selecting means comprises a piston stop disposed within the chamber which abuts the piston at the travel limit of the piston.

12. The fluid control mechanism of claim 11, wherein the piston stop is moveable along a direction along which the piston is moveable.

13. A fuel injection control mechanism for split injection, comprising:

an inlet orifice adapted for connection to a high pressure fuel line;

an outlet orifice adapted for connection to a fuel injection nozzle;

a main passage connecting the inlet orifice and the outlet orifice;

a chamber having first and second ends;

a check valve disposed between the main passage and the first end of the chamber;

a piston stop disposed in the chamber;

a piston slidably mounted within the chamber between the piston stop and the check valve;

biasing means disposed between the piston and the second end of the chamber and exerting a force on the piston;

means accessible from outside the chamber for allowing adjustment of the piston stop and the force exerted by the biasing means on the piston; and a removable cap enclosing the adjustment allowing means.

14. The fuel injection control mechanism of claim 13, wherein the adjusting means comprises first and second nuts threaded onto cylindrical surfaces outside the chamber.

15. The fuel injection control mechanism of claim 13, wherein the biasing means comprises a helical compression spring.

16. The fuel injection control mechanism of claim 15, wherein the adjustment allowing means includes a spring stop contacted by the spring.

17. The fuel injection control mechanism of claim 16, wherein the piston stop includes a threaded outer surface and the spring stop includes a threaded inner surface threaded onto the outer surface of the piston stop and further includes a threaded outer surface threaded into a threaded bore in a wall separating the chamber from an adjustment compartment.

18. The fuel injection control mechanism of claim 17, wherein the adjusting means comprises a first nut threaded onto the outer surface of the piston stop and a second nut threaded onto the outer surface of the spring stop.

19. The fuel injection control mechanism of claim 13, further comprising an O-ring disposed between the cap and the main body.

* * * * *